B. WOLHAUPTER.
MEANS FOR INSULATING RAIL JOINTS.
APPLICATION FILED APR. 5, 1912.
1,034,379.
Patented July 30, 1912
2 SHEETS—SHEET 1.
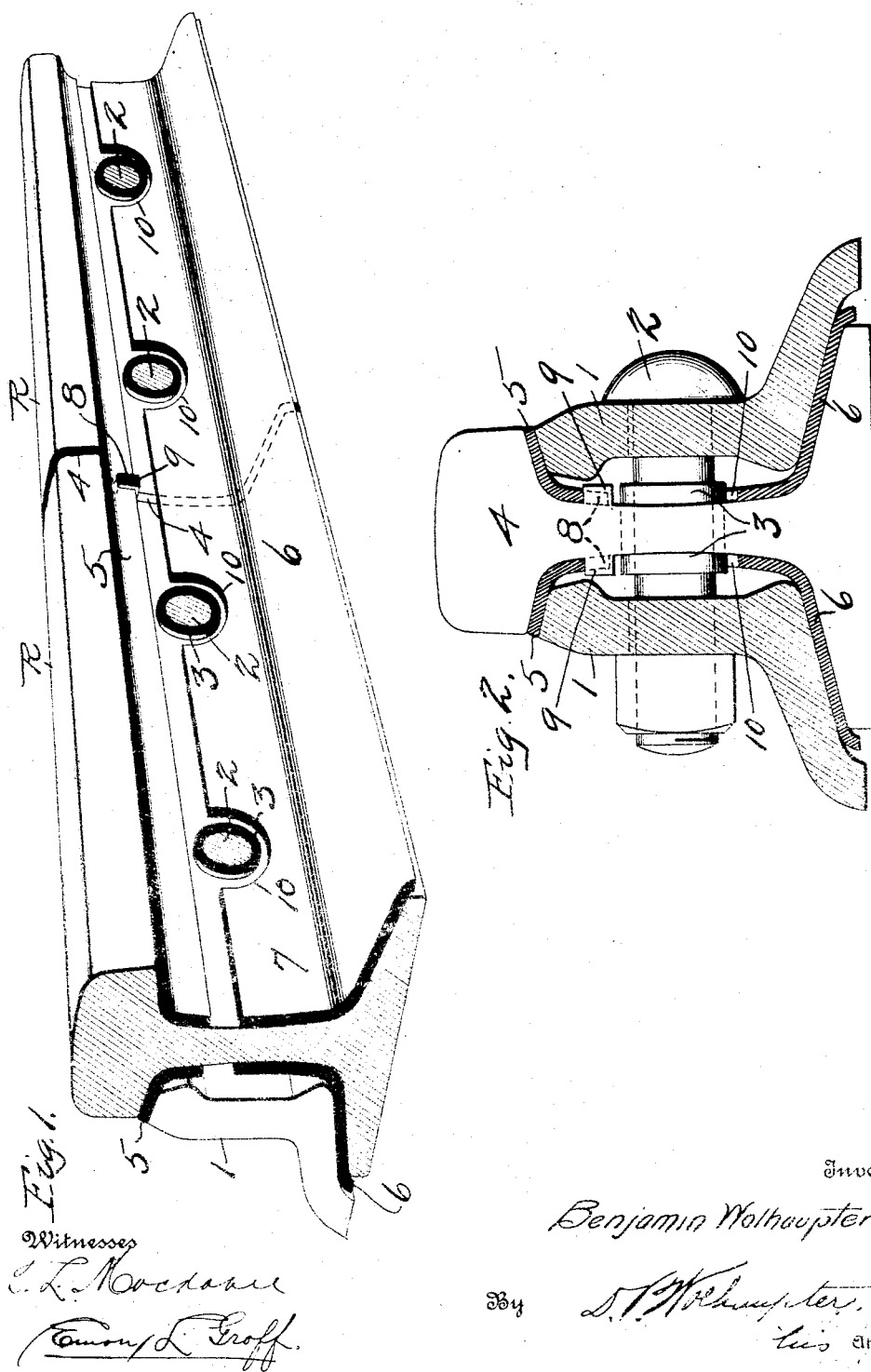
Witnesses
Inventor
Benjamin Wolhaupter
By
his Attorney

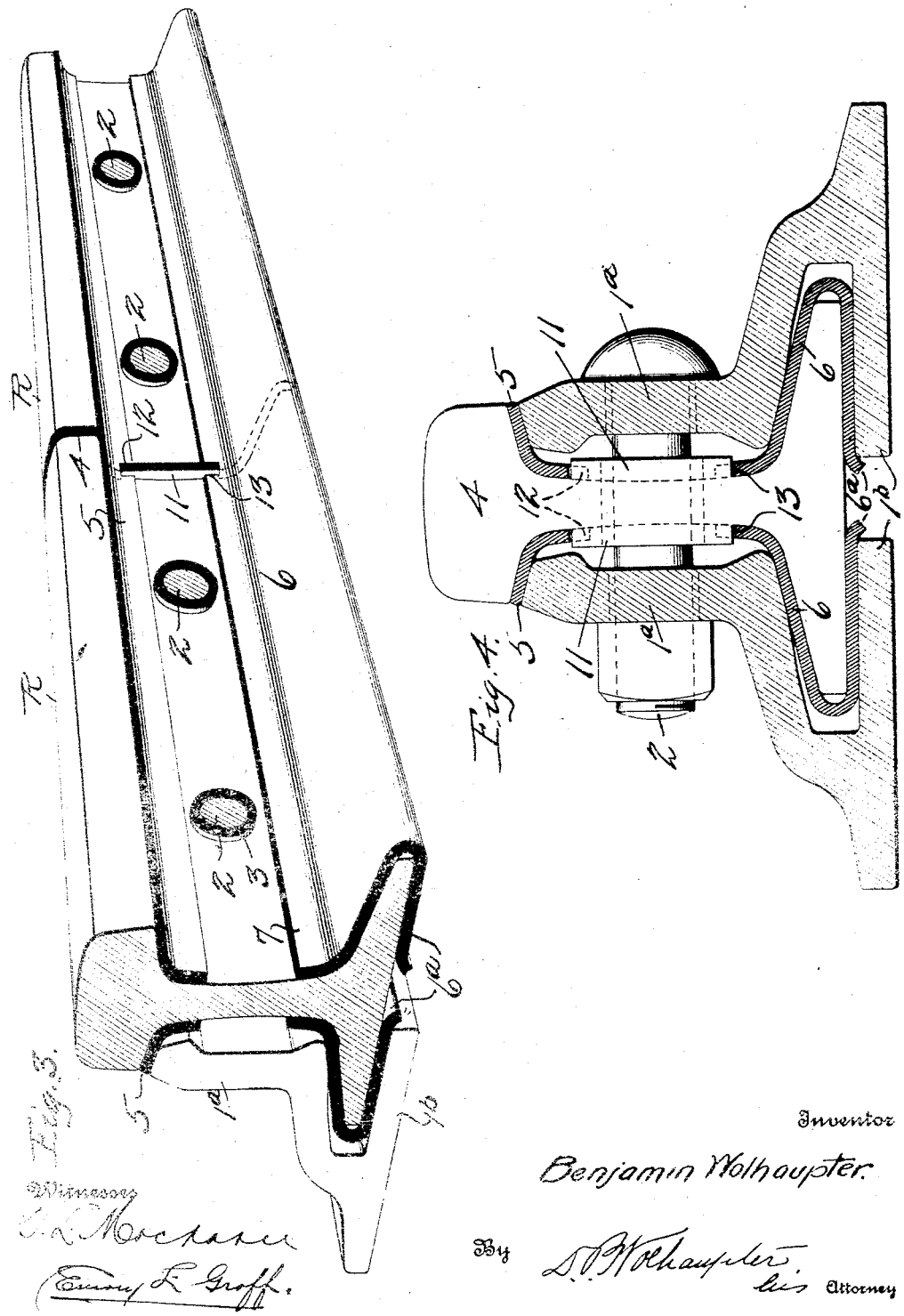

UNITED STATES PATENT OFFICE.

BENJAMIN WOLHAUPTER, OF NEW ROCHELLE, NEW YORK, ASSIGNOR TO THE RAIL JOINT COMPANY, OF NEW YORK, N. Y., A CORPORATION OF NEW YORK.

MEANS FOR INSULATING RAIL-JOINTS.

1,034,379.  Specification of Letters Patent.  Patented July 30, 1912.

Application filed April 5, 1912. Serial No. 688,779.

*To all whom it may concern:*

Be it known that I, BENJAMIN WOLHAUPTER, a citizen of the United States, residing at New Rochelle, in the county of Westchester and State of New York, have invented certain new and useful Improvements in Means for Insulating Rail-Joints, of which the following is a specification.

This invention relates to insulation for rail joints of the insulated type, and more particularly to that character of rail-joint insulation known as "divided-fiber", wherein the insulation is in two parts, respectively for the head and base flange portions of the rails, whereby a minimum amount of insulating material may be used to the best advantage both electrically and mechanically, and admitting of the ready removal and replacing of worn-out pieces of insulation without disturbing or affecting the remaining good or unworn insulation.

The object of the present invention is to provide novel and practical means for effecting a locking in place of the separate pieces or sections of insulation in order to secure them against relative displacement or creeping under load conditions imposed thereon, thus contributing to the life of the insulation and maintaining its proper insulating relation to the rails and to the joint bars. To this end, the present invention contemplates an improved means for interlocking the separate pieces or sections of two-part insulation for rail joints, primarily by an indirect interlock between the two afforded through novel combinations with the insulating end post between the rail ends.

With these and many other objects in view which will more readily appear as the details of the invention are fully understood, the same consists in the novel construction, combination, and arrangement of parts hereinafter more fully described, illustrated, and claimed.

Though susceptible of embodiment in various types of rail joints, and adaptable for use with any form of joint bar or splice that may be employed in an insulated rail joint, a few practical embodiments of the invention are shown for illustrative purposes in the accompanying drawings, in which—

Figure 1 is a perspective view of an insulated rail joint provided with insulation constructed and arranged in accordance with the present invention; the view omitting one of the side joint bars to fully expose the novel insulation. Fig. 2 is a vertical transverse sectional view at the center of the rail joint shown in Fig. 1, the view illustrating the complete joint. Fig. 3 is a view similar to Fig. 1 showing a modification of the invention wherein different means are employed for locking both sections of insulation against longitudinal movement; the view also illustrating the invention as employed in connection with joint bars of the continuous type, thereby illustrating the adaptability of the improvements to various kinds of rail joints and joint bars. Fig. 4 is a vertical transverse sectional view at the center of the joint shown in Fig. 3, the view illustrating the complete joint, and also illustrating the invention as employed in connection with the continuous type of joint bar.

Like references designate corresponding parts in the several figures of the drawings.

The improved insulation expedients forming the subject matter of this application are intended to be applicable to various kinds of rail joints, and hence available for use with fish plates, plain angle bars, angle bars of the continuous type, channel bars, or any of the divers forms of splices which connect the rails and extend across the joint between them. In all of its applications the invention possesses the same utility and subserves the same functions.

As above indicated, the present invention relates to novel means for interlocking the two sections or pieces of divided-insulation for rail joints. This divided-insulation is usually in two parts, respectively for the head and base flange portions of the rails. These separate sections are separately renewable and replaceable, and by way of illustrating the application of my invention thereto, reference is first made to Fig. 1 of the drawings, wherein is shown an insulated rail joint including the rails R, R, side joint bars 1, the usual joint bolts 2 having suitable bolt insulation 3, an insulating end post 4 between the rail ends, and divided or two-part side insulation between the rails and the joint bars, said insulation comprising an upper head section 5, and a lower base section 6. The "insulation 3" is simply shown for illustrative purposes and it will be understood that any of the approved and well known bolt insulating expedients between the bolts and the joint bars or between the bolts and other metal parts may be employed without affecting the present invention.

The sections of insulation 5 and 6 are made of the usual fiber sheets, or other well known insulating material, and each of the same may extend the entire length of the joint or be of less extent, without affecting the improvements claimed herein. As plainly shown in Fig. 1, the head section of insulation 5 is arranged above the line of joint bolts 2 and occupies an insulating position between the under side of the rail heads and the bearing head of the adjoining joint bar, while the lower or base section of insulation 6 is arranged over the base flange of the rails between the latter and the foot flange of the joint bar 1, said base section of insulation 6 also including at its inner edge an upstanding flange portion 7 arranged next to the webs of the rails to effectually insulate the bottom inside corners of the joint bars from the rails.

A distinctive feature of the present invention resides in the provision of means for locking both sections of two-part insulation for rail joints, preferably through novel combinations with the insulating end post between the rail ends. Various expedients may be utilized for accomplishing this result. In illustration thereof, reference is first made to Fig. 1 of the drawings, wherein the upper head section of insulation 5 is shown as being provided with a keeper socket or notch 8 which separably interlocks with a lateral locking tongue or extension 9 projecting from the edge of the insulating end post 4, as is plainly shown in both Figs. 1 and 2 of the drawings. A direct interlock is thus secured between the insulating end post 4 and the upper or head section of insulation 5, thereby effectually preventing longitudinal movement, as well as downward displacement or movement of said head section of insulation, while longitudinal movement of the lower or base section of insulation 6 may be accomplished by resorting to other means, such for instance as providing the flange portion 7 of each base section of insulation with bolt-receiving recesses or notches which bear an interlocking relation to the joint bolts so that the latter act as stops to prevent said longitudinal movement of the base section. Accordingly, it will be observed that in this form of the invention it is the intention to prevent longitudinal movement of one of the sections of insulation by an interlock between the same and the end post, and to prevent similar movement of the other section of insulation by an interlock between the same and the joint bolts, it being immaterial as far as the invention is concerned which section of insulation is locked by the joint bolts or which is locked by the end post.

To illustrate the intended scope of the present invention, there is shown in Figs. 3 and 4 of the drawings a modification wherein the two sections of insulation 5 and 6 are locked together by means of wide locking tongues or projections 11, which are projected laterally from the edges of the web portion of the insulating end post 4 and are of a sufficient length vertically to extend entirely across the interval between the head and base sections of insulation 5 and 6 and to separably interlock with keeper sockets or notches 12 and 13, which are provided in the inner edges respectively of the said head and base sections of insulation. It will thus be seen that according to this modification of the invention, both sections of the insulation have a direct, separable interlocking engagement with the locking elements of the end post, whereby the latter effectually secures both sections of insulation against longitudinal movement. Furthermore, in Figs. 3 and 4 of the drawings, the adaptability of the improvements to various kinds of joints and joint bars is exemplified by showing the same embodied in a rail joint including a joint bar 1ª of the well known continuous type. To adapt the invention to the continuous type of joint bar, the base section of insulation 6 is provided with a bottom piece or member 6ª that is interposed between the bottom of the rails and the rail supporting base plate 1ᵇ of the joint bar.

Various other modifications, and various changes in the form, proportion and minor details of construction may be resorted to without departing from the spirit or sacrificing any of the advantages of the invention.

I claim:

1. In an insulated rail joint, the combination with the rails and the splices therefor, of separate head and base sections of insulation, the insulating end post, and means, including the end post, for preventing longitudinal movement of both of said sections of insulation.

2. In an insulated rail joint, the combination of the rails and the splices therefor, of separate head and base sections of insulation, and the insulating end post having means for locking both sections of insulation against longitudinal movement.

3. In an insulated rail joint, the combination of the rails and the splices therefor, of separate head and base sections of insulation, and the insulating end post having a locking element separably interlocked with both sections of insulation.

4. In an insulated rail joint, the combination of the rails and the splices therefor, of separate head and base sections of insulation having sockets in their edges, and the insulating end post having a projecting locking tongue interlocking with the sockets of said sections of insulation.

5. In an insulated rail joint, the combination of the rails and the splices therefor, of separate head and base sections of insulation having sockets in their edges, and the insulating end post having a projecting locking tongue interposed between and separably interlocking with the sockets of said sections of insulation.

In testimony whereof I hereunto affix my signature in the presence of two witnesses.

BENJAMIN WOLHAUPTER.

Witnesses:
E. F. SCHERMERHORN,
K. MCNALLY.